Aug. 20, 1968   R. E. LIEBER ET AL   3,398,087
INTERACTING CONTROL OF DISTILLATION
Filed May 19, 1966   2 Sheets-Sheet 1

ROY E. LIEBER
ERIC VANDER SCHRAAF   INVENTORS
WARREN J. PASSAU

BY   *James T. Bryan*

PATENT ATTORNEY

> United States Patent Office 3,398,087
Patented Aug. 20, 1968

3,398,087
INTERACTING CONTROL OF DISTILLATION
Roy E. Lieber, Hackensack, Eric Vander Schraaf, Morris Plains, and Warren J. Dassau, Califon, N.J., assignors to Esso Research and Engineering Company, a corporation of Delaware
Filed May 19, 1966, Ser. No. 551,292
4 Claims. (Cl. 208—350)

ABSTRACT OF THE DISCLOSURE

The present invention is directed to a method of controlling a refinery process, particularly those carried out in distillation units, catalytic crackers and the like, where a change in a manipulated variable effects a change in more than one controlled variable. An interacting controller is utilized to initiate changes in manipulated variables in response to changes in the controlled variables.

---

This invention relates to an apparatus and method for achieving interacting control, and more particularly relates to the application of such control for a pipestill.

In many refinery processes, for example, the distillation of crude oil in a pipestill, a disturbance or planned change in a controlled variable of one product stream causes a disturbance in the other controlled variables of that stream and the other product streams. In addition, the change of a manipulated variable to compensate for the deviation of a controlled variable oftentimes causes further unwanted changes in the other controlled variables. In other words, a disturbance in one controlled variable may be corrected in response to a change in the manipulated variable, but the other controlled variables, in response to such a change, will often deviate further from the desired value.

For purposes of illustration, let us examine the operation of a pipestill. Material balance control is a conventional method of controlling a pipestill. Typical sidestream product specifications are first sidestream flash point, first sidestream end point, and second sidestream end point. The overhead temperature is controlled in order to control inferentially the first sidestream flash point. The first sidestream flow rate is set to give the desired end point on the first sidestream and the second sidestream flow rate sets the second sidestream end point. If there is a disturbance in one of the controlled variables, for example, if the flash point of the first sidestream is off specification, the operator's first action is to change the set point of the overhead temperature controller. This changes the flash point of the first sidestream, but it also changes the end points of both the first and second sidestreams. The operator then has to readjust sidestream flow rates; but every time he adjusts one of the sidestreams, he not only affects the variable, for example, flash point of the first sidestream, that he wants to change, but he also causes a change in the other two controlled variables, the end points of the first and second sidestreams. Finally, by some sort of operator's convergence routine, he gets all of the sidestreams on specification, but when another upset or disturbance in operation occurs, he has to start readjusting again. The result is that the sidestream flow rate and overhead temperature must be adjusted very often.

It was thought that closed loop analyzer control would solve the serious problems experienced in manual control. The matrix of transfer functions for such a system was programmed on an analog computer. The control system was synthesized, programmed, and checked. In this system a controller, in response to a deviation in flash point of the first sidestream, adjusted the set point of the overhead temperature controller. In addition, a controller adjusted the flow rate of the first sidestream in response to a change in end point of the first sidestream, and on the second sidestream a controller in response to a change in end point of the second sidestream adjusted the flow rate of the second sidestream.

This system gave some improvement but did not solve the problem. The interaction between the controlled and manipulated variables caused the controllers to fight each other and it took hours for the system to settle, even when the controllers were properly tuned. And, tuning three controllers where there is a strong interaction between the variables controlled by them is almost an impossibility. To tune the controllers one has to set one at a time with the other two on manual control. When all of the controllers are finally tuned and put on automatic, they are likely to be unstable and will have to be detuned because of the interactions.

It thus appeared that there was a need to devise a system for breaking the interactions in order to obtain a stable control system.

It is therefore an object of this invention to provide a method and apparatus to minimize the duration and magnitude of the deviation of controlled variables in a refinery process in response to a disturbance of such variables.

It is a further object of this invention to provide a system which compensates for the natural interactions of the controlled variables of the product streams.

Other objects will become apparent as one reads the following description of the instant invention.

The objects of this invention are achieved by the use of an interacting controller which coordinates the actions of the controller in the aforementioned analyzer control system. In this controller the signals representing deviations in outputs from the primary (flash point and both end points) controllers are adjusted and then combined so that a portion of each signal is sent to each controller of the manipulated variables. The adjustment to the signal includes corrections for steady state gain and dynamic compensation. The adjustments are made by a calculation, e.g. a computer, which is designed in accordance with a matrix of transfer functions calculated as described hereinafter.

The computation used for this system can be derived from a model of the process. The interrelationships involved are graphically depicted as high order curves. However, it has been found that in many instances it will be sufficient to approximate the high order curves as first order or exponential curves in order to simplify the calculation. It has been found that in many instances very little is gained if a high order approximation is used for the interacting controller. Thus, generally, it is not necessary to provide a more complex solution than that obtained from low order approximations.

A better understanding of the invention will be obtained by reading the following description taken in connection with the attached drawings in which.

Figure 1:
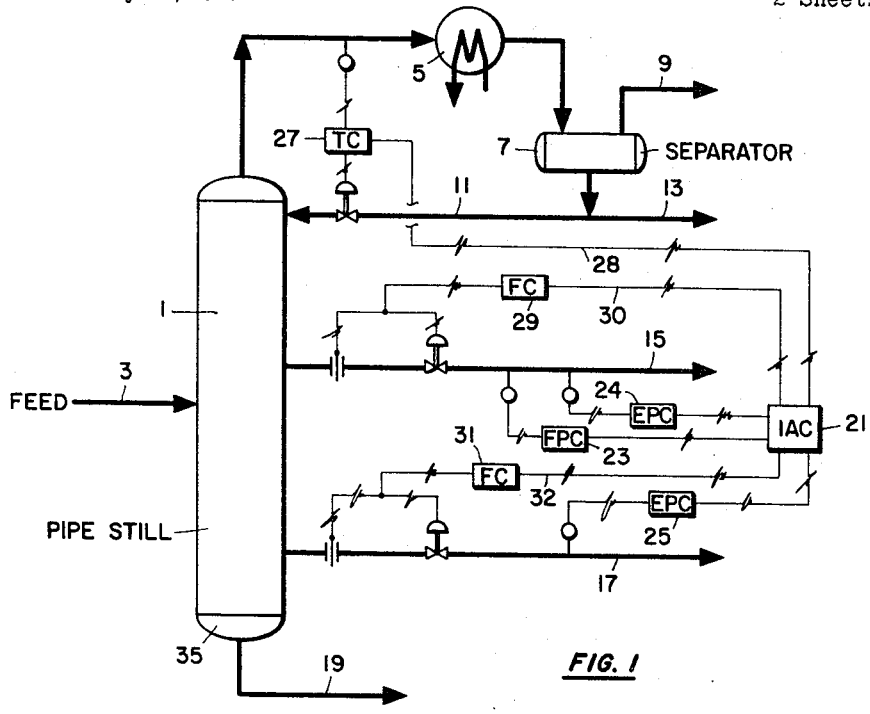
FIGURE 1 is a schematic drawing of a pipestill equipped with the control system of this invention.

Referring in detail to FIGURE 1, one sees a pipestill 1 having a feed inlet 3 for the purpose of introducing crude oil into the column, an overhead reflux condenser 5, a separating drum 7 for the purpose of separating the gas, for example, fuel gas which is transmitted through outlet 9, from the liquid; part of the liquid is reintroduced into the top of the tower via line 11; the rest of the liquid, for example gasoline, is removed from the system via line 13. The higher boiling fraction, for example kerosene, is removed via the first sidestream 15 and a still higher boiling fraction, for example diesel oil is removed via the second sidestream 17. The bottoms product is transferred out of the system through line 19.

Inputs are received by the computer 21, which serves as the interacting controller, from the flash point controller 23 and the end point controller 24 which control the flash point and end point, respectively, of the first sidestream. In addition, the computer 21 receives an input from the end point controller 25 representing deviations from the measured end point of the second sidestream. In the computer, the signals received are modified and combined as discussed hereinafter and corrective signals are sent to the temperature controller 27 via line 28, to the flow controller 29 of the first sidestream via line 30, and to the flow controller 31 of the second sidestream via line 32.

It is thus seen that in the illustrative system of FIGURE 1, that the flash point and end point of the first sidestream and the end point of the second sidestream are the controlled variables; and the overhead temperature, the flow rate of the first sidestream, and the flow rate of the second sidestream are the manipulated variables. These are the preferred manipulated variables because it has been found that the correction can best be made by such manipulations. Other variables can be chosen. For example, in some systems the only controlled variable in the first sidestream may be flash point. Other combinations of manipulated variables can also be employed. For example, the heat input into the reboiler 35 could be manipulated to cause the desired changes, or in some instances it may be desirable to use a pump-around system (not shown) to remove heat from the tower to cause the desired effect in the controlled variables. In addition, a feed forward control system can be used in combination with the interacting control system in those instances where there are significant disturbances in the feed.

Figure 4:
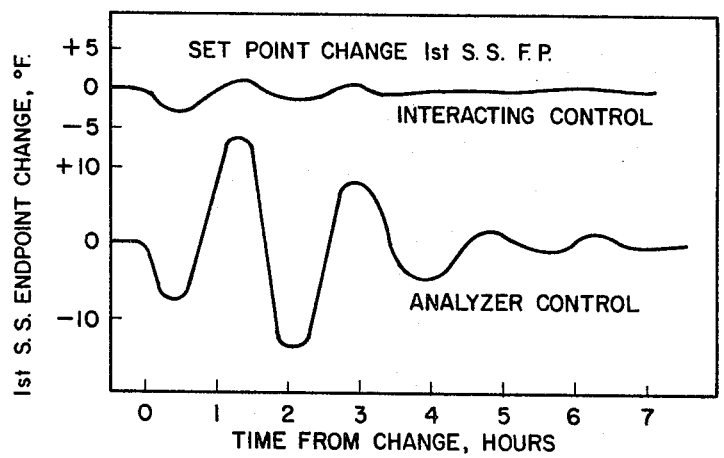
FIGURE 4 is a graph depicting a comparison of the magnitude and duration of changes to the first sidestream end point with interacting control to such changes with the use of a conventional analyzer control system.

The interacting control system hereindescribed provides a system which minimizes the duration and magnitude of the deviation of controlled variables in response to a change in one or more of such variables. Thus, for example, if it is desired to change the set point of the first sidestream flash point, or if the first sidestream flash point goes off specification due to some disturbance in the process, the change in flash point is detected and a signal is sent by the flash point controller 23 to the interacting controller 21. The signal is adjusted and corrective signals are sent to the temperature controller 27 and flow controllers 29 and 31 to change the manipulated variables to correct for the change in flash point of the first sidestream. If the control system has been perfectly designed, no disturbance will occur in the other controlled variable. Perfection, however, is difficult to obtain, thus it is likely that disturbance will occur in the end points of the first and second sidestream. Signals will then be sent by end point controllers 24 and 25 to the interacting controller to further correct for these changes. Thus at one point in time the controller 21 may be receiving signals from the flash point controller 23 and the end point controllers 24 and 25. The signals are combined and adjusted and sent to the manipulated variables to further correct for the initial disturbance in the flash point of the first sidestream. The desired flash point is soon reached and the end points of the first and second sidestream quickly return to their desired values. As shown in FIGURE 4 (which is discussed in detail hereinafter) the use of the interacting control system of this invention results in much smaller deviations of shorter duration than are experienced with the use of a conventional analyzer controller.

In accordance with this invention, the signals from the analyzer controllers of the sidestreams of the pipestill are modified by the application of steady state gain correction and dynamic compensation. Dynamic compensation includes correction for dead time and modification of responses to correspond to the path of the response curves of the various interrelated variables.

The first step in determining the control functions is to determine the matrix of process transfer functions. The process is represented in transfer function form by either open loop tests or simulation techniques to get time domain responses which are then converted by a frequency response technique to the Laplace domain.

The process transfer functions, $G_1$ through $G_9$, are representatives of the steady state gain and the dynamic responses of the process. Thus the following equation represents the process transfer function, $G_9$, for the change in flash point, FP, of the first sidestream per degree change in overhead temperature, $\Delta T$:

$G_9 = \Delta FP/\Delta T =$ (steady state gain) (transient response)

In a simplified system, $G_9$ can be approximated as being equal to the steady state gain. In such a system, the controlled variables will eventually return to their predetermined values after a disturbance in the system, and the control equipment, if analog controllers are used, will be simple and inexpensive. However, the failure to correct for dynamic differences will result in larger deviations in the controlled variables for relatively longer durations than a more accurate model.

Steady state gain constants (SSG), as explained hereinafter, can be easily determined. The dynamic compensation is a complex function representing the differences in the response curves of the changes in controlled variables resulting from a change in manipulated variables and is determined by simultaneous solutions of the dynamic representations.

Referring to FIGURE 2, one sees the time domain response curves obtained from open loop tests of a typical pipestill. In determining the time domain response curves by open loop tests, one manipulated variable is changed while the other manipulated variables are held constant. Thus, as shown in FIGURE 2a, the reflux rate of the overhead is adjusted to give a change in overhead temperature of 10° F. The response of the controlled variables, i.e. the first sidestream end point and flash point, and the second sidestream end point, are recorded. The response curves are shown in FIGURES 2b, 2c, and 2d. From this time domain data, three of the nine process transfer functions can be determined by using a frequency response technique. Thus the process function, $G_9$, described hereinbefore can be determined as follows. The steady state gain is obtained by dividing the total change in first sidestream flash point (20° F.) by the change in overhead temperature (10° F.). The dead time, $\tau$, shown in FIGURE 2b, is the time after the step change in overhead temperature before any change in flash point occurs. The response curve is transformed into the Laplace domain by frequency response technique and the curve may be approximated as a simple, first order lead-lag function. Thus.

$$G_9 = SSG \frac{(1+T_1S)}{(1+T_2S)} e^{-\tau S}$$

Figure 2A:
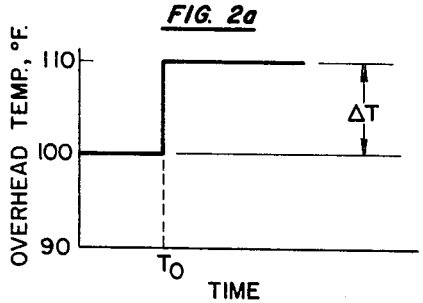
FIGURE 2 is a series of graphs depicting the step change in overhead temperature and the corresponding changes in first sidestream flash point, first sidestream end point and second sidestream end point.
Figure 2B:
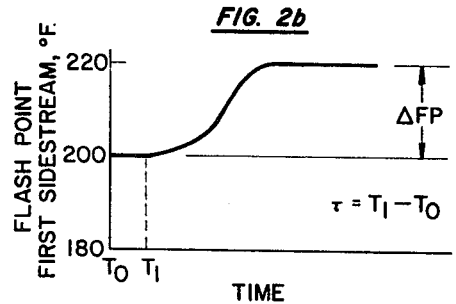
Figure 2C:
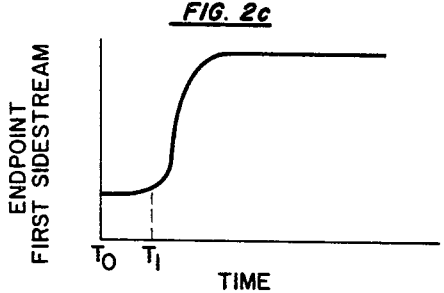
Figure 2D:
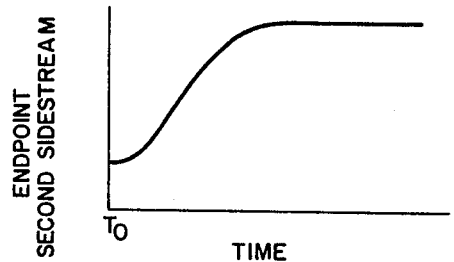

$G_8$, which is the transfer function representing the change in end point of the second sidestream per degree change in overhead temperature, and $G_7$, which is the transfer function representing the change in end point of the first sidestream per degree change in overhead temperature, can be similarly determined from the curves similar to those depicted in FIGURES 2c and 2d.

The process transfer functions $G_4$, $G_5$, and $G_6$ can be determined by an open loop test wherein the overhead temperature and flow rate of the first sidestream are maintained constant while a step change in the flow rate is applied to the second sidestream. The response curves of flash point of the first sidestream, end point of the first sidestream, and end point of the second sidestream versus time are plotted to determine the time domain response curves; and $G_4$, which is the change in the first sidestream end point divided by the change in flow rate of the second sidestream, $G_5$, which is the change in second sidestream end point divided by the change in flow rate of the second sidestream, and $G_6$, which is the change in first sidestream flash point divided by the change in second sidestream flow rate can be determined from the time domain data by a frequency response technique.

To determine $G_1$, $G_2$, and $G_3$, the remaining manipulated variable, that is the flow rate of the first sidestream, is subjected to a step change while the other two manipulated variables are maintained constant. $G_1$, which is the process transfer function representing a change in end point of the first sidestream in response to a change in the flow rate of the sidestream, $G_2$, which is the process transfer function representing a change in the end point of the second sidestream as a result of a change in the flow rate of the first sidestream, and $G_3$, which is the process transfer function representing the change in the flash point of the first sidestream resulting from a change in the flow rate of the first sidestream can be calculated by frequency response techniques. The following table shows the matrix of the process transfer functions for a typical pipestill.

$$\Delta EP_1, \quad C_1 + \frac{0.37e^{-8S}}{1-34S} = G_1 \quad + \frac{.04e^{-7S}}{1+40S} = G_4 \quad + \frac{1.68(1+7.65)e^{-8S}}{1+32.55} = G_7$$

$$\Delta EP_2, \quad C_2 + \frac{0.23e^{-15S}}{1+40S} = G_2 + \frac{0.27e^{-15S}}{1+35S} = G_5 + \frac{0.763(1+7.65)e^{-11S}}{1+41.5S} = G_8$$

$$\Delta FP_3, \quad C_3 + \frac{0.14e^{-20S}}{1+37S} = G_3 \quad 0 = G_6 \quad + \frac{1.0(1+7.6S)e^{-10S}}{(1+15S)^2} = G_9$$

In the above table:

$\Delta EP_1$ is the change in the end point of the first sidestream.

$C_1$ represents the total change in end point of the first sidestream resulting from changes in the manipulated variables.

$\Delta EP_2$ is the change in the end point of the second sidestream.

$C_2$ represents the total change in the end point of the second sidestream resulting from changes in the manipulated variable.

$\Delta FP$ is the change in the flash point of the first sidestream.

$C_3$ represents the total change in the flash point of the first sidestream resulting from changes in the manipulated variable.

$F_1$ represents the total change in the flow rate of the first sidestream.

$F_2$ represents the total change in flow rate of the second sidestream.

$F_3$ represents the total change in overhead temperature.

The above-defined terms are best understood by referring to the following equations which represent a linearized model of the system.

$C_1 = F_1 G_1 + F_2 G_4 + F_3 G_7$ (Equation 1)
$C_2 = F_1 G_2 + F_2 G_5 + F_3 G_8$ (Equation 2)
$C_3 = F_1 G_3 + F_2 G_6 + F_3 G_9$ (Equation 3)

Figure 3:
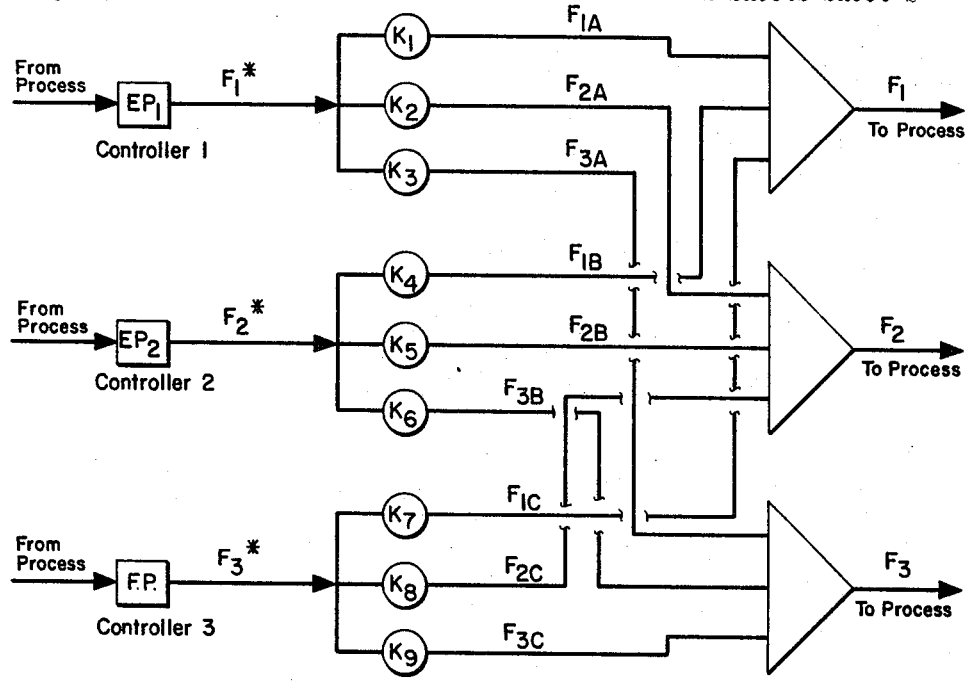
FIGURE 3 is a schematic drawing showing the path of the signals in the interacting control system.

Before studying the solution of the various interacting relationships, one should refer to FIGURE 3, wherein the system and symbols are illustrated. The entire system illustrated by FIGURE 3 could be programmed into a digital computer. However, for purposes of illustration, the controllers shown therein are of the conventional type as shown by controllers 24, 23, and 25 in FIGURE 1. The rest of the system can either be programmed on a digital computer or analog computers, electronic or pneumatic.

The analyzer controller 24 continuously monitors the end point of the first sidestream and transmits a correction signal $F_1^*$ into the interacting controller. If the interacting controller were not employed, then $F_1^*$ would equal $F_1$, which is the input to the flow rate of the first sidestream flow controller. $F_1^*$ is divided and modified in accordance with the interacting control relationships, $K_1$, $K_2$, and $K_3$ and the signals are sent to the set point of the first sidestream flow controller, the set point of the second sidestream flow controller, and the set point of the overhead temperature controller. Looking at the process inputs, $F_1$, $F_2$, and $F_3$, it is seen that $F_1$ receives a signal, $F_1^*K_1$, from the controller 24 of the end point of the first sidestream, a signal $F_2^*K_4$, from the controller 25 of the end point of the second sidestream, and a signal, $F_3^*K_7$, from the flash point controller 23 of the first sidestream. Similarly, the flow controller of the second sidestream receives a signal, $F_2$, comprising the sum of the signals from all of the controllers, which are a signal, $F_1^*K_2$ from the end point controller of the first sidestream, a signal, $F_2^*K_5$, from the controller of the end point of the second sidestream, and a signal, $F_3^*K_8$, from the flash point controller of the first sidestream. In a like fashion, the overhead temperature controller receives a signal, $F_3$, comprising a signal, $F_1^*K_3$, from the end point controller of the first sidestream, a signal, $F_2^*K_6$, from the end point controller of the second sidestream, and a signal, $F_3^*K_9$, from the flash point controller of the first sidestream.

The K's in FIGURE 3 represent the interacting control relationships by which the signals from the controllers must be modified with regard to dynamic compensation and steady state gain before they are applied as input to the controllers of the manipulated variable. The K functions are obtained as follows:

From the above description, one sees that $F_1$, $F_2$, and $F_3$ can be expressed as follows:

$F_1 = F_1^*K_1 + F_2^*K_4 + F_3^*K_7$ (Equation 4)
$F_2 = F_1^*K_2 + F_2^*K_5 + F_3^*K_8$ (Equation 5)
$F_3 = F_1^*K_3 + F_2^*K_6 + F_3^*K_9$ (Equation 6)

In this system, the desired result is to break the interactions so that each output behaves as if it recognized only its corresponding controller. Therefore we are trying to make:

$C_1 = F_1^*G_1$
$C_2 = F_2^*G_5$
$C_3 = F_3^*G_9$

To solve for $K_1$, $K_2$, and $K_3$, we take the situation where $F_1^* = F_1^*$ and $F_2^* = F_3^* = 0$. We then see the following:

$C_1 = F_1^*G_1$
$C_2 = F_2^*G_5 = 0$
$C_3 = F_3^*G_9 = 0$

Substituting the above terms into Equations (1), (2), and (3), we get the following:

$C_1 = F_1^*G_1 = F_1G_1 + F_2G_4 + F_3G_7$ (Equation 7)
$C_2 = 0 = F_1G_2 + F_2G_5 + F_3G_8$ (Equation 8)
$C_3 = 0 = F_1G_3 + F_2G_6 + F_3G_9$ (Equation 9)

Substituting Equations (4), (5) and (6) in Equations (7), (8), and (9), eliminating terms with $F_2^*$ and $F_3^*$ (=0) and cancelling $F_1^*$, we get:

$G_1 = K_1 G_1 + K_2 G_4 + K_3 G_7$ (Equation 10)
$0 = K_1 G_2 + K_2 G_5 + K_3 G_8$ (Equation 11)
$0 = K_1 G_3 + K_2 G_6 + K_3 G_9$ (Equation 12)

The G values are known. See the table hereinabove and the accompanying discussion. Thus, we have three equations and three unknowns and $K_1$, $K_2$, and $K_3$ can be determined.

Similarly, taking the case where $F_1^* = F_3^* = 0$ and $F_2^* = F_2^*$ will yield, $K_4$, $K_5$, and $K_6$; and where $$F_1^* = F_2^* = 0$$

and $F_3^* = F_3^*$ we can get $K_7$, $K_8$, and $K_9$.

Expressing this operation in matrix form we are looking for $G^{-1}$, where G is the overall 3×3 process matrix, and $GG^{-1} = 1$, the identity matrix.

The values obtained for $K_1$, $K_2$, and $K_3$ should be adjusted to yield $K_1 = 1.0$ (divide each by K) to yield the same overall individual loop gain and thereby permit simple tuning of the control loop by tuning it with the other loops on manual. These same settings may now be used with the interacting controller when all loops are on automatic.

The K values are a function of the G values which are the process transfer functions of the pipestill. If the G values are approximated as being merely a steady state function, then the K values will likewise be constants, although the system is dynamically imperfect. The result will be that the interacting controller programmed in accordance with the K values will eventually return the controlled variables to the desired values after a disturbance in the system. However, the magnitude and duration of the deviations from the desired values will be much greater than in the system where the K values are determined from the G values which are determined as a function of both steady state gain and dynamic compensation.

Once the K values are obtained as described above, the relationships can be programmed on a digital or analog computer which acts as the interacting controller of the system. The accuracy with which the process transfer functions, $G_1$ through $G_9$, are computed will determine the efficiency of the interacting controller in returning the controlled variables to the desired values in response to a disturbance.

It is thus seen that in accordance with this system, a change in any crontrolled variable results in a change in all three manipulated variables. Controlled variables, the flash point and end point of the first sidestream and the end point of the second sidestream are monitored to detect deviations from the desired values. The analyzer controllers which monitor the streams initiate signals representing the magnitude and polarity of each deviation. These are the same signals that would be obtained if a conventional analyzer control system were being employed. However, the system described herein differs from the analyzer control system in that an interacting controller is utilized to supplement the system. In such controller, each signal is modified to compensate for process interrelationships. The modified signals are then algebraically combined to obtain signals representing the changes in manipulated variables, i.e. overhead temperature, and flow rates of the first and second sidestream, required to set the controlled variables at the desired values. Thus, if the analyzer controller 25 of FIGURE 2 detects a deviation between the set point of the controller and the end point of the second sidestream, it generates a signal, $F_2^*$, which represents the change in the system required to compensate for the deviation. This would be the same signal that the controller would generate if the interacting controller were not employed in the system. This signal, $F_2^*$, however, is modified to compensate for steady state gain and dynamic compensation to obtain three signals, $F_2^* K_4$, $F_2^* K_5$, and $F_2^* K_6$. These three signals are combined with the signals from the other controllers and the combined signals are sent to the controllers of the manipulated variables. Initially, the signals from the other controllers, for example, $F_1^* K_2$, may be 0. Thus, the signals sent to the set point of the flow controller of the second sidestream will equal $F_2^* K_5$ plus $F_1^* K_2$ which would equal $F_2^* K_5$. However, if the $K_4$, $K_5$, and $K_6$ have not been perfectly calculated, the change in manipulated variables instituted by the end point controller of the second sidestream will cause deviations in the end point of the first sidestream and flash point of the first sidestream. The signals representing such deviations will be modified and combined and sent to the controllers of the manipulated variables to return the controlled variables of the system to the desired values.

In summary, this invention applies to refinery process units in general where such unit has a plurality of controlled variables and manipulated variables and where there is an interrelationship between such variables. The interacting controller can be designed to correct with steady state compensation, and not with dynamic compensation. However, much better results are achieved if the K values are calculated in terms of steady state and dynamic compensation.

The control system described herein has particular application for a distillation unit. There are many combinations of manipulated variables that can be chosen. However, in this case the manipulated variables are overhead temperature and the flow rates of the first and second sidestream, where the controlled variables are the end point and flash point of the first sidestream and the end point of the second sidestream. If other controlled variables are chosen or if there are more than two sidestreams, the concept described herein can be applied to such a system. If the system is identical to the one discussed here and the described manipulated variables are chosen, then good results can be obtained by utilizing an interacting controller which merely compensates for steady state gain. However, much better results are obtained if the interacting controller also corrects for dynamic compensation. The correction for dynamic compensation can be realized at a relatively small increase in cost if a digital computer is employed.

In correcting for dynamic compensation, dead time should be accounted for. However, the curve representing the continuing change of a controlled variable in response to a change in manipulated variable may be approximated as an exponential or other low order curve. This will be adequate for many systems and will result in a substantial savings, especially in the systems where analog computers are utilized.

Tests were run to compare the magnitude and duration of deviations in controlled variables in the system utilizing interacting control with that utilizing conventional analyzer control. The preferred manipulated variables described herein were chosen and the controlled variables were the flash point and end point of the first sidestream and end point of the second sidestream. The set point of the first sidestream flash point controller was changed and the resulting deviations of the first sidestream end point were monitored and recorded. FIGURE 4 is a graph comparing the deviations resulting in the interacting system with those recorded with the use of the conventional analyzer control system. It is readily seen that the magnitude and duration of the deviations in the first sidestream end point are much greater where the conventional analyzer control system was used.

The invention described herein has been directed primarily to the operation of a pipestill. However, the principles of interacting control can also be applied to other refinery processes; for example, the principles can be applied to the control of the catalytic cracking process. In such an system the control variables are reactor dense bed temperature, plenum temperature, and carbon on regenerated catalyst. The reactor dense bed level is also a required process input. The manipulated variables are catalyst flow from the reactor to control reactor holdup, catalyst flow from the regenerator to control overall catalyst circulation rate, air flow to the regenerator, and fuel gas rate to the preheat furnace.

This invention has been described with a certain degree of particularity. Various aspects of the system described herein may be changed or modified without departing from the scope of the invention as hereinafter claimed.

What is claimed is:
1. A method of controlling a distillation unit wherein there is an inter-relationship between the various controlled variables and manipulated variables comprising:
monitoring the flash point and end point of the first sidestream and the end point of the second sidestream to detect deviations from the desired values of these controlled variables;
obtaining signals representing the magnitude and polarity of each such deviation;
modifying each signal to obtain a signal to initiate changes in the overhead temperature and the flow rates of the first and second sidestreams;
modifying each signal to compensate for steady state characteristics of the process;
algebraically combining the modified signals to obtain signals representing the changes in overhead temperature and flow rates of the first and second sidestreams required to set the controlled variables at the desired values; and
changing the overhead temperature and the flow rates of the first and second sidestreams in response to said combined modified signals.

2. A method of controlling a distillation unit wherein there are a plurality of controlled variables and manipulated variables and where a change in manipulated variable effects a change in more than one controlled variable comprising:
monitoring the flash point and end point of the first sidestream and the end point of the second sidestream to detect deviations from the desired values of these controlled variables;
obtaining signals representing the magnitude and polarity of each deviation;
modifying each signal to obtain signals to initiate changes in the overhead temperature and the flow rates of the first and second sidestreams;
modifying each signal to correct for steady state and dynamic characteristics of the process;
algebraically combining the modified signals to obtain signals representing the changes in overhead temperature and flow rates of the first and second sidestreams required to set the controlled variables at the desired values; and
changing the overhead temperature and the flow rates of the first and second sidestreams in response to said combined and modified signals.

3. A method according to claim 2 wherein the modification for said dynamic characteristics comprises a modification for dead time and a low order approximation of the response of a controlled variable to a change in a manipulated variable.

4. A method of controlling a pipestill comprising:
monitoring the flash point and end point of the first sidestream and the end point of the second sidestream to detect deviations from the desired values of these controlled variables;
obtaining signals representing the magnitude and polarity of each deviation;
modifying each signal to obtain separate signals to initiate changes in the overhead temperature and the flow rates of the first and second sidestreams;
modifying each signal to compensate for steady state and dynamic characteristics of the process;
algebraically combining modified signals to obtain signals representing the changes in overhead temperature and flow rates of the first and second sidestreams required to set the controlled variables at the desired values;
changing the overhead temperature and the flow rates of the first and second sidestreams in response to said combined, modified signals.

References Cited

UNITED STATES PATENTS

| | | | |
|---|---|---|---|
| 3,196,189 | 7/1965 | Ogle et al. | 260—683.3 |
| 3,316,322 | 4/1967 | Glahn | 260—683.65 |
| 3,108,929 | 10/1963 | Tolin et al. | 202—160 |
| 3,143,643 | 8/1964 | Fluegel et al. | 235—150 |
| 3,197,138 | 7/1965 | Lupfer | 235—200 |
| 3,213,014 | 10/1965 | Atkinson et al. | 208—113 |
| 2,239,457 | 3/1966 | Heckart | 208—341 |

DELBERT E. GANTZ, *Primary Examiner.*

H. LEVIN, *Assistant Examiner.*